United States Patent [19]

Saito

[11] 4,369,077

[45] Jan. 18, 1983

[54] METHOD OF MANUFACTURING AN ELECTROMAGNETIC CORE

[75] Inventor: Shigemasa Saito, Gyoda, Japan

[73] Assignee: Fuji Electric Company, Ltd., Kanagawa, Japan

[21] Appl. No.: 200,421

[22] Filed: Oct. 24, 1980

[30] Foreign Application Priority Data

Dec. 29, 1979 [JP] Japan ............................ 54-171878
Dec. 29, 1979 [JP] Japan ............................ 54-171879

[51] Int. Cl.³ .............................................. H01F 1/00
[52] U.S. Cl. ................................. 148/120; 148/12 A; 72/275; 72/286; 72/352; 72/360; 29/602 R
[58] Field of Search .................. 148/12 A, 12 B, 120; 29/602 R, 607; 72/275, 286, 352, 360

[56] References Cited

U.S. PATENT DOCUMENTS 1,723,769  8/1929  Davis ................................ 148/12 B
3,695,946 10/1972  Demeaux ............................ 148/120
3,881,967  5/1975  Cochardt et al. ................... 148/120
3,952,571  4/1976  Yokota et al. ....................... 72/286

OTHER PUBLICATIONS

"Magnetic Characteristics of Mild Steel" by Hachiro Takubo and Fumio Tsutsumi, published in *Nitsuko Giho* No. 3 (1970).

*Primary Examiner*—John P. Sheehan
*Attorney, Agent, or Firm*—Brumbaugh, Graves, Donohue & Raymond

[57] ABSTRACT

A method of manufacturing stationary electromagnetic cores utilizes mild steel having a carbon content of up to 0.01% by weight and an impurity content of less than 0.31% by weight. Use of this material lowers the cost of manufacturing electromagnetic cores by shortening the drawing process and obviating the necessity for magnetic annealing.

9 Claims, 9 Drawing Figures

METHOD OF MANUFACTURING AN ELECTROMAGNETIC CORE

BACKGROUND OF THE INVENTION

This invention relates to a method of manufacturing stationary electromagnetic cores and, more particularly, to manufacturing electromagnetic cores for relay switches and similar devices.

Soft magnetic iron (SUYB in the Japanese Industrial Standard) or low-carbon steel, are the materials commonly used in the manufacture of electromagnetic cores. In order to optimize the magnetic properties of the cores, materials containing 0.005% or less carbon, 0.05% or less manganese and 0.03% sulphur by weight (w) are generally used. In particular, soft magnetic iron (SUYB), a low-carbon soft iron containing about 0.005% (w) carbon and about 0.43% (w) impurities such as silicon, manganese, phosphorus and sulfur, is used.

Electromagnetic cores are manufactured by subjecting the material to hot rolling, cold-drawing the roll to a wire rod of a predetermined diameter, annealing the rod and pressing the rod to form a head and a boss on the core. The core is magnetically annealed to optimize its magnetic properties and finally subjected to surface treatment, such as copper and nickel plating.

In order to optimize the magnetic properties of the low-carbon soft iron, the magnetic annealing processes are repeated at least five times. This repetition results in a high manufacturing cost. The omission of magnetic annealing would necessitate stress relief during the annealing step of the cold drawing. Stress relief results in lowering the electromagnetic properties and coarsening of the ferrite grain size. Thus, stress relief lowers the ductility the metal will have in the pressing operation and decreases its adaptability to plating.

Although the use of low-carbon steel lowers the cost of materials and shortens the cold drying process, a decarburization step is required during the annealing process in order to optimize the magnetic properties.

SUMMARY OF THE INVENTION

The present invention is directed to the manufacture of electromagnetic cores at low cost while shortening the drawing process and obviating the necessity for a magnetic annealing step.

The object of the present invention is achieved through the use of mild steel having a carbon content of up to 0.01% by weight and an impurity content of less than 0.31% by weight. Such a steel lowers the cost of manufacturing electromagnetic cores by shortening the drawing process and obviating the necessity for magnetic annealing. It has also been found that the use of mild steel yields an electromagnetic core which is similar in magnetic properties to soft magnetic iron and low-carbon steel cores.

In an illustrative embodiment of the invention an electromagnetic core is manufactured from a hot-drawn wire rod of mild steel containing about 0.01% or less by weight of carbon and an impurity content of less than about 0.31% by weight. The mild steel material, instead of the usual soft magnetic iron, is then subjected to cold-drawing at a work rate* of about 20% or more, followed by the annealing of the cold-drawn wire rod. The annealing of the cold-drawn wire is achieved by heating the rod at a temperature between about 600° C. and 700° C. for a minimum of three hours and a maximum of eight hours, cooling the rod gradually to a temperature between about 550° C. and 650° C., and air-cooling the rod. Following the annealing there is a finish-drawing of the annealed wire rod at a work rate of about 8% or less. The finished wire rod is cut and pressed to form the desired shape of the electromagnetic core. The surface of the electromagnetic core is then treated with copper and nickel, if desired. The cold-drawing of the wire rod after the hot-drawing is necessary to produce a uniform ferrite grain size, irrespective of the conditions in the subsequent processes.

*According to this invention, work rate is defined as $(S_1-S_2)/S_1$ where $S_1$ is the cross-sectional area of a piece before being worked and $S_2$ is that after being worked, and work rate is expressed as a non-dimensional value.

A preferred embodiment of the invention uses a work rate of about 40% or more for the cold-drawing process. The annealing is accomplished by heating the rod to about 650° C. for five hours, cooling the rod gradually to a temperature of about 600° C. at a rate of 17° C./hour for three hours and then air-cooling the rod. This annealing relieves the strain caused by the cold-drawing and permits the grain boundaries to move easily.

In order to reduce residual stress, the finish-drawing follows the stress-relief annealing. A work rate of about 10% or less, preferably 8% or less, is required. A work rate exceeding 10% would increase the strain and spoil the electromagnetic properties.

The electromagnetic core so produced has an acceptable fine ferrite grain size of approximately number 6 on the JIS (Japanese Industrial Standard) scale and shows quite stable electromagnetic properties. The use of mild steel in the invention without magnetic annealing yields a product of comparable or even superior magnetic properties to soft magnetic iron or low-carbon steel. Since this invention substantially shortens the drawing process and obviates the necessity of magnetic annealing, manufacturing costs are remarkably decreased (e.g. by about 40%).

BRIEF DESCRIPTION OF THE DRAWINGS

The foregoing and other features of the present invention will be more readily apparent from the following detailed description and drawings of illustrative embodiments of the invention in which.

DESCRIPTION OF EXEMPLARY EMBODIMENTS

Figure 1:
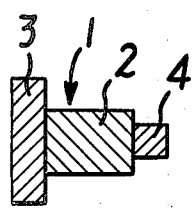
FIG. 1 and FIG. 2 are illustrative embodiments of electromagnetic cores according to the invention.
Figure 2:
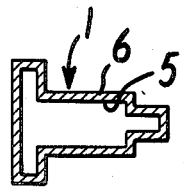

In FIGS. 1 and 2 there are shown typical examples of electromagnetic cores 1 which have been pressed into the shape of flange electromagnetic cores for 24 volt D.C. use. Core 1 is formed with a shaft portion 2, a flange-shaped head portion 3 and a boss portion 4. Portions 3 and 4 are formed at opposite ends of the shaft portion 2 as shown in FIG. 1. Core 1 may be provided with a copper plating 5 and nickel plating 6 as shown in FIG. 2.

Figure 3:
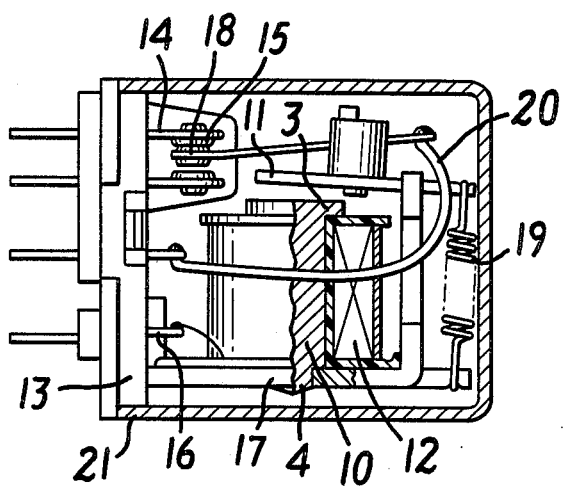
FIG. 3 is a partial sectional view of a control relay containing an electromagnetic core of the type shown in FIG. 1 or FIG. 2.

Flanged core 1 can be used as a stationary electromagnetic core for a control relay in an automatic vender as shown in FIG. 3. The relay includes a stationary electromagnetic core 10, which may be like the cores of FIGS. 1 and 2. The shaft of this core is surrounded by a winding 12 in order to form an electromagnet capable of attracting movable armature 11 against the action of spring 19 and toward head portion 3 of core 10, whenever winding 12 is energized. A yoke 17 is used to mount the electromagnet to a base 13 of the relay, which base is also used to mount a terminal plate 16 for providing electrical connections to the winding. The electromagnetic core of the type shown in FIGS. 1 and 2 is used in the relay in order to provide a large contact area between the head portion 3 and the movable armature 11, and to allow for the easy and secure mounting of the core to the yoke 17 by the boss portion 4.

Movement of the armature 11 by energizing winding 12 causes a movable contact member 18 attached to the armature to move away from the upper stationary conact 14, with its contact tip 15, toward a lower contact, thus creating relay action. A lead 20 connects the movable member to the terminal plate, but the stationary contacts are mounted directly on this plate.

Figure 4:
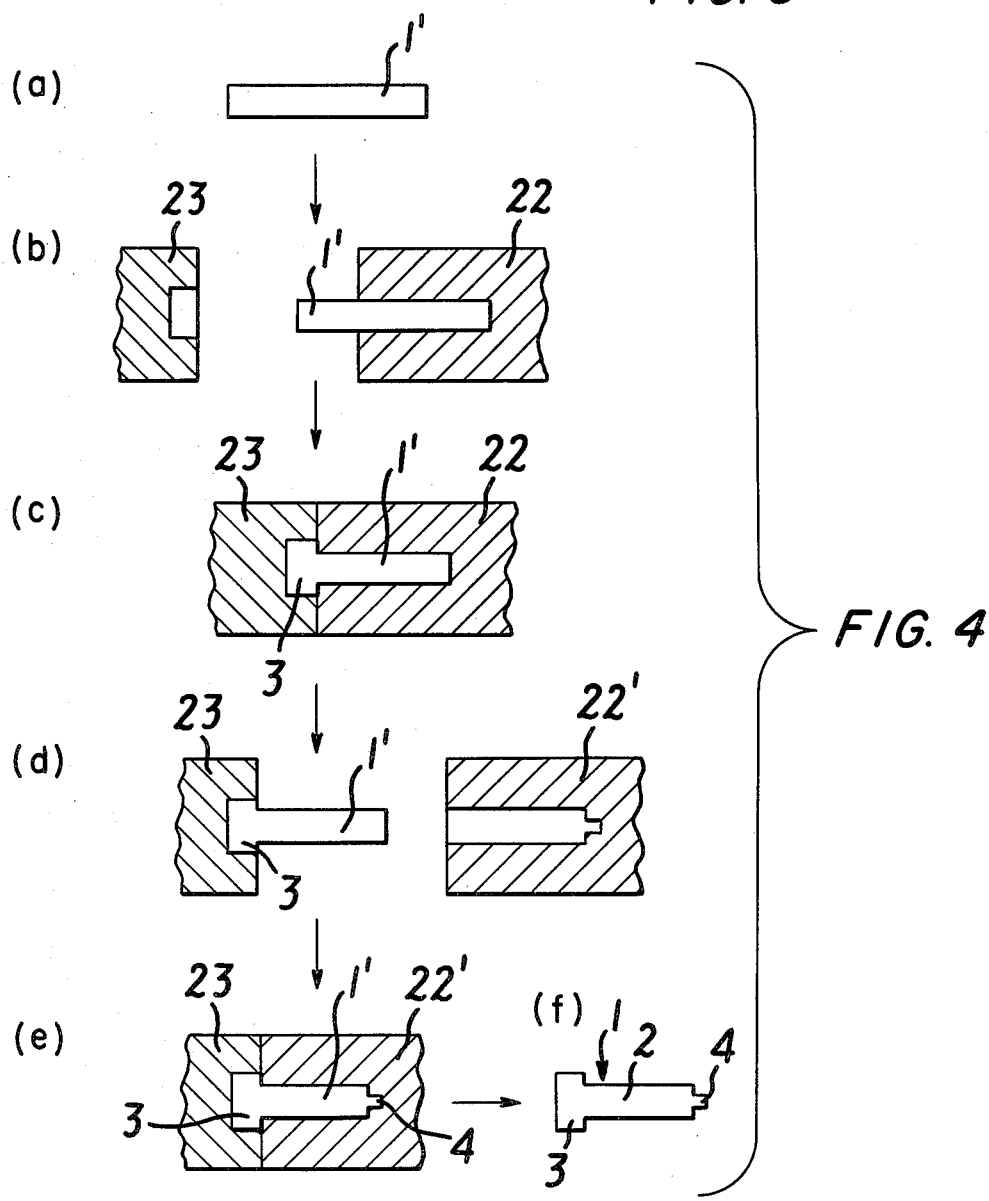
FIG. 4 is a schematic illustration of a process for pressing an electromagnetic core formed according to the present invention.

In producing the electromagnetic cores of FIGS. 1 and 2, the finish-drawn wire rod is cut into the desired lengths and pressed to form the flange-shaped head portion and the boss portion. The pressing process takes place in steps as shown in FIGS. 4(a) through (f). FIG. 4(a) shows a piece of wire rod 1' cut into the desired length. The piece 1' is placed in die 22 as in FIG. 4(b). A punch 23 presses an end of the piece 1' to form the flange-shaped head 3 as shown in FIGS. 4(b) and (c). The piece 1' is then held in the mouth of the punch 23 while die 22 is replaced with another die 22' and the core is pressed as shown in FIGS. 4(d) and (e) to form the boss. After taking the piece 1' out of the die 22', the electromagnetic core 1, with shaft, head and boss portions 2, 3 and 4, is as depicted in FIG. 4(f). In the pressing step for preparing the flanged magnetic core, it is preferable to form the head and boss portions 3 and 4 respectively, from the piece 1' at a work rate not exceeding 0.5%. A work amount over this rate is undesirable, since it may cause strain on the shaft portion and affect the electromagnetic properties of the product.

Figure 6:
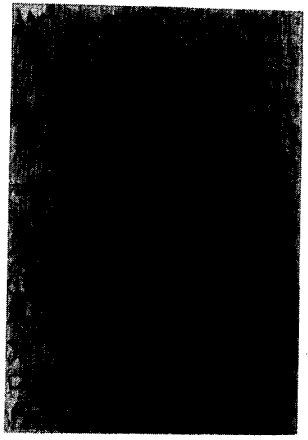
FIG. 6 is a photomicrograph (120 power magnification) of the head of the electromagnetic core according to the present invention.
Figure 7:
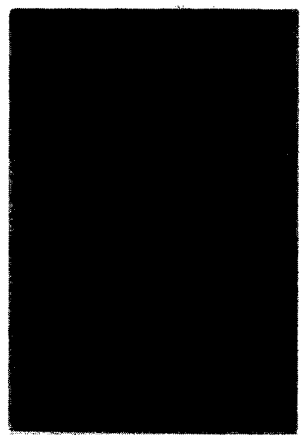
FIG. 7 is a photomicrograph (120 power magnification) of the shaft of the electromagnetic core according to the present invention.
Figure 8:
FIG. 8 is a photomicrograph (120 power magnification) of the boss of the electromagnetic core according to the present invention.

Some flow structure may be seen in the flange-shaped head portion 3 and the boss portion 4 of the electromagnetic core 1. Although such flow structures may lower the electromagnetic properties of these portions, it does not affect the electromagnetic properties of the core as a whole, since portions 3 and 4 constitute a minor part of core 1. In fact, in a typical example the core has a flanged-head portion of 0.5 mm, a shaft protion of 14 mm and a boss portion of 3 mm, all in longitudinal length. FIG. 6, FIG. 7 and FIG. 8 are photomicrographs (120 power magnification) which show the metallurgical constructions of the electromagnetic core of the invention. FIG. 6 and FIG. 8 show the flow structure of the head and boss portions while FIG. 7 shows the shaft portion has a uniform ferrite grain size (JIS size number 6) without any appreciable strain.

After the pressing step to form the electromagnetic core, it is subject to surface treatment, such as copper plating followed by nickel plating.

EXAMPLE

Figure 5:
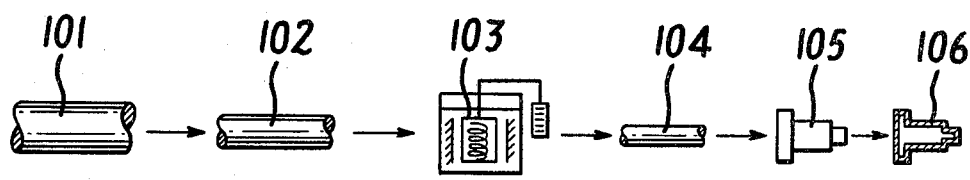
FIG. 5 is a schematic illustration of the process of manufacturing cores according to the present invention.

A wire rod material 101 of mild steel having a diameter of about 7 mm was subjected to cold drawing 102 to form a wire rod at a work rate of 48%, as shown in FIG. 5. After heating for five hours at about 650° C., gradually cooling for three hours at about 600° C., and air-cooling to room temperature, the cold-drawn wire was subjected to annealing 103. The annealed wire rod was then subjected to finish-drawing 104 at a work rate of 8%. The finish-drawn wire was cut and subjected to pressing 105 at a work rate of 0.5% to form head and boss portions. The pressed piece was subjected to surface treatment 106, such as 5μ of copper plating followed by 6μ of nickel plating.

Table 1 lists the chemical components of the materials used, the rate of cold-drawing work and the magnetizability of mild steel cores and magnetic soft iron (SUYB) cores.

TABLE 1

| | Material | Chemical components (% in weight) | | | | | Work rate (%) | Magnetizability | Ferrite grain size number in JIS |
|---|---|---|---|---|---|---|---|---|---|
| | | C | Si | Mn | P | S | | | |
| A | Mild | 0.01 | 0.01 | 0.23 | 0.01 | 0.01 | 48 | good* | 6 |
| B | steel | | | | | | 16 | inferior | mixed sizes (3 ~ 18) |
| | Magnetic soft iron (SUYB) | 0.005 | 0.15 | 0.25 | 0.02 | 0.01 | — | good | 3 |

*Good magnetizability means similar magnetic flux density is produced by identical magnetic-motive force in comparison with the SUYB core.

Figure 9:
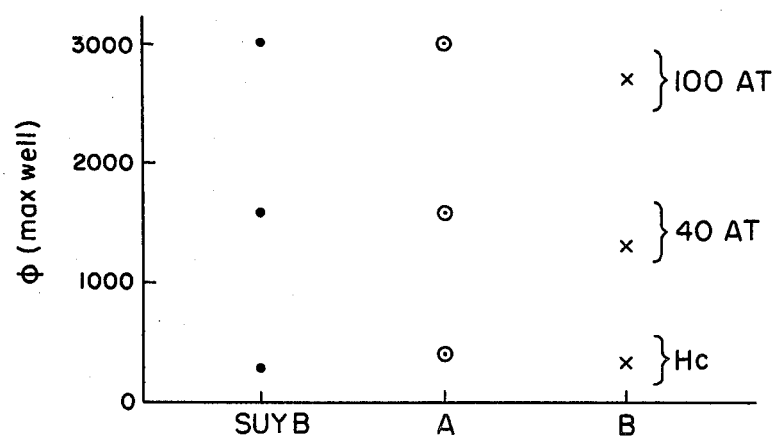
FIG. 9 illustrates the results of magnetization tests comparing the present invention to soft steel electromagnetic cores.

Mild steel electromagnetic (A and B of Table 1) and magnetic soft core SUYB cores were tested for magnetization using a D.C. magnetization measuring device. The results are summarized in FIG. 9, wherein the mild steel core A formed at a work rate of 48% exhibited magnetizability comparable to that of the SUYB core. The mild steel core B with a 16% cold-drawing work rate exhibited inferior magnetizability.

While the invention has been particularly shown and described with reference to preferred embodiments thereof, it will be understood by those skilled in the art that various changes in form and details may be made therein without departing from the spirit and scope of the invention.

I claim:

1. A method of manufacturing an electromagnetic core material comprising the steps of:
   (a) hot-drawing a wire rod of mild steel containing about 0.01% or less by weight of carbon and an impurity content of less than about 0.31% by weight;
   (b) cold-drawing the hot-drawn wire rod;
   (c) annealing the cold-drawn wire rod; and
   (d) finish-drawing the annealed wire rod at a work rate of about 10% or less.

2. A method as claimed in claim 1 wherein the cold-drawing of the wire rod in step (b) is at a work rate of about 20% or more.

3. A method as claimed in claim 1 wherein the cold-drawing work rate is 40% or more.

4. A method as claimed in claim 1 wherein the finish-drawing work rate is 8% or less.

5. A method as claimed in claim 1 wherein the annealing of the cold-drawn wire rod in step (c) comprises the step of heating the rod at a temperature between about 600° C. and 700° C. for a minimum of three hours and a maximum of eight hours, cooling the rod gradually to a temperature between about 550° C. and 650° C., and air-cooling the rod.

6. A method as claimed in claim 5 wherein the annealing of the cold-drawn wire comprises the steps of heating the rod to about 650° C. for about five hours, cooling the rod gradually to a temperature of about 600° C. at a rate of about 17° C./hour for three hours, and air-cooling the rod.

7. A method as claimed in claim 1 further comprising the steps of cutting the rod into shafts and pressing each shaft to form a flange-shaped head portion and boss portion at opposite ends of said shaft.

8. A method as claimed in claims 1, 5 or 7 further comprising the steps of plating the surface of the electromagnetic core material with copper.

9. A method as claimed in claims 1, 5 or 7 further comprising the steps of plating the surface of the electromagnetic core material with nickel.

* * * * *